United States Patent
Zhou et al.

(10) Patent No.: US 12,275,230 B1
(45) Date of Patent: Apr. 15, 2025

(54) NANO-SILICA COMPOSITE THERMAL INSULATION MATERIAL AND PREPARATION METHOD THEREFOR

(71) Applicant: JIANGSU YIRUIDA COMPOSITE MATERIALS TECHNOLOGY CO., LTD., Jiangsu (CN)

(72) Inventors: Yanbo Zhou, Jiangsu (CN); Xiaoqing Liu, Jiangsu (CN)

(73) Assignee: JIANGSU YIRUIDA COMPOSITE MATERIALS TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/010,794

(22) Filed: Jan. 6, 2025

Related U.S. Application Data (63) Continuation of application No. PCT/CN2024/126675, filed on Oct. 23, 2024.

(30) Foreign Application Priority Data

Jan. 2, 2024 (CN) .......................... 202410001569.3

(51) Int. Cl.
| | | |
|---|---|---|
| B32B 9/04 | (2006.01) | |
| B32B 7/12 | (2006.01) | |
| B32B 33/00 | (2006.01) | |
| B32B 37/10 | (2006.01) | |

(52) U.S. Cl.
CPC ................ *B32B 9/047* (2013.01); *B32B 7/12* (2013.01); *B32B 33/00* (2013.01); *B32B 37/10* (2013.01); *B32B 2262/106* (2013.01); *B32B 2264/1021* (2020.08); *B32B 2264/107* (2013.01); *B32B 2264/303* (2020.08); *B32B 2305/08* (2013.01); *B32B 2305/22* (2013.01); *B32B 2305/30* (2013.01); *B32B 2307/304* (2013.01); *B32B 2307/3065* (2013.01); *B32B 2307/72* (2013.01)

(58) Field of Classification Search
None
See application file for complete search history.

(56) References Cited

FOREIGN PATENT DOCUMENTS

| | | |
|---|---|---|
| CN | 103803934 A | 5/2014 |
| CN | 104476857 A | 4/2015 |
| CN | 110655379 A | 1/2020 |
| CN | 113666675 A | 11/2021 |
| CN | 114523748 A | 5/2022 |
| CN | 115867516 A | 3/2023 |
| CN | 117484971 A | 2/2024 |

OTHER PUBLICATIONS

Xu, CN 113666675, Nov. 19, 2021 (machine translation) (Year: 2021).*
Office Action received in corresponding Chinese patent application No. 202410001569.3, dated Feb. 6, 2024, 16 pages.
International Search Report received in corresponding International Patent Application No. PCT/CN2024/126675, mailed Jan. 3, 2025, 3 pages.

* cited by examiner

*Primary Examiner* — Cheng Yuan Huang
(74) *Attorney, Agent, or Firm* — Cooper Legal Group, LLC (57) ABSTRACT

The present application relates to a nano-silica composite thermal insulation material and a preparation method thereof. The nano-silica composite thermal insulation material includes a reinforcement mesh and thermal insulation layers arranged on two sides of the reinforcement mesh; the reinforcement mesh and the thermal insulation layers are bonded by an inorganic binder; wherein raw materials of each of the thermal insulation layer include the following components in parts by weight: 60-90 parts of nano-silica, 15-35 parts of a light-screening agent and 1-10 parts of a fiber. The thermal insulation material of the present application has advantages of low thermal conductivity, excellent thermal insulation performance, long-lasting high-temperature resistance and burn-through resistance, reducible thickness, high tensile strength and high cost performance.

4 Claims, 3 Drawing Sheets

NANO-SILICA COMPOSITE THERMAL INSULATION MATERIAL AND PREPARATION METHOD THEREFOR

CROSS-REFERENCE TO RELATED APPLICATION

The present application is a continuation of PCT application serial No. PCT/CN2024/126675, filed on Oct. 23, 2024, which claims the priority benefits of China patent application No. 202410001569.3, filed on Jan. 2, 2024. The entireties of PCT application serial No. PCT/CN2024/126675 and China patent application No. 202410001569.3 are hereby incorporated by reference herein and made a part of this specification.

FIELD OF THE INVENTION

The present application relates to a field of thermal insulation materials and, in particular, to a nano-silica composite thermal insulation material and a preparation method thereof.

BACKGROUND OF THE INVENTION

A thermal insulation board is a plate-shaped material composed of a high-barrier film, a porous core material and an adsorbent, which is made by a molding process. The thermal insulation board has attracted widespread attention due to its ultra-low thermal conductivity. A core material is mainly made of a mixture of a glass fiber, chopped strands, silica, and a binder. The thermal insulation board with silica as a core material has been widely studied and rapidly developed due to its advantages such as low thermal conductivity, long service life, and environmental friendliness.

With regard to currently common thermal insulation boards, most of them are made by bonding various raw materials with glue such as a pressure-sensitive adhesive, followed by pressing and drying. During a production process, the glue used for bonding materials easily blocks pores in the core material such as silica, thereby reducing the thermal insulation effect of the core material and shortening the service life of the thermal insulation board. In view of this, the present application provides a nano-silica composite thermal insulation material.

SUMMARY

In order to improve the thermal insulation effect and service life of a thermal insulation board, the present application provides a nano-silica composite thermal insulation material and a preparation method thereof.

In a first aspect, the present application provides a nano-silica composite thermal insulation material and adopts the following technical solution.

A nano-silica composite thermal insulation material, including a reinforcement mesh and thermal insulation layers arranged on two sides of the reinforcement mesh, the reinforcement mesh and the thermal insulation layers are bonded by an inorganic binder; wherein
  raw materials of the thermal insulation layer include the following components in parts by weight: 60-90 parts of nano-silica, 15-35 parts of a light-screening agent and 1-10 parts of a fiber.

According to the above technical solution, the nano-silica with good fireproof and thermal insulation effect can effectively reduce heat conduction, heat radiation and heat convection in the material, and give the material good thermal insulation performance; the light-screening agent in the material can reduce a radiative heat transfer of the material, block a path of infrared radiation, and achieve a purpose of blocking heat radiation; the fiber has excellent thermal insulation performance, can effectively insulate heat in the material, and inhibit heat conduction; since a pore size of nano-silica is 20-50 nm, which is smaller than the mean free path (69 nm) of air, gas molecules in the pores cannot flow freely, thereby basically losing an ability of macroscopic movement, inhibiting a thermal movement between gas molecules, and blocking heat convection. By use of the nano-silica, the light-screening agent and the fiber in combination, the thermal insulation material has excellent thermal insulation effect. Moreover, use of the reinforcement mesh can keep the material in a specific shape and improve a use strength of the material. Use of the inorganic binder for binding the thermal insulation layers and the reinforcement mesh can avoid pore blockage of the material which happens in use of glue. The inorganic binder has excellent temperature resistance and is not easily decomposed by heat during later use, thereby ensuring stable connection between the thermal insulation layers and the reinforcement mesh. Moreover, because the inorganic binder is used between the thermal insulation layers and the reinforcement mesh for bonding, without blocking the pores in the nano-silica and the fiber in the thermal insulation layers, the thermal insulation layers can maintain a long-lasting and excellent thermal insulation effect, and the thermal insulation material has a long service life.

In a specific implementable solution, the inorganic binder is at least one selected from a group consisting of sodium water glass, potassium water glass, lithium water glass, and nano-silica resin.

According to the above technical solution, the sodium water glass, the potassium water glass and the lithium water glass are a silicate mixture of sodium, a silicate mixture of potassium, and a silicate mixture of lithium, respectively, which have good bonding performance, high-temperature resistance, high stability, and can effectively bond the thermal insulation layers and the reinforcement layer; the nano-silica resin with high-temperature resistance and excellent corrosion resistance and weather resistance can effectively bond the thermal insulation layers and the reinforcement mesh at high temperatures, thereby reducing a possibility of separation of the insulation layers from the reinforcement mesh and affecting the thermal insulation effect of the thermal insulation material.

In a specific implementable solution, the nano-silica is fumed silica or silica aerogel; the reinforcement mesh is a glass fiber mesh, a high-silica fiber mesh, a basalt fiber mesh, a ceramic fiber mesh, a pre-oxidized fiber mesh, a carbon fiber mesh, or a metal mesh.

In a specific implementable solution, the metal mesh is made of stainless steel, an aluminum alloy or a copper-based material, with a mesh size of 2-30 meshes, preferably 5-15 meshes, and can be specifically 2 meshes, 3 meshes, 5 meshes, 13 meshes, 15 meshes, 20 meshes, 25 meshes or 30 meshes.

According to the above technical solution, the fumed silica with a high specific surface area and porosity can form a microscopic pore structure in the material, thereby effectively blocking heat transfer, improving the thermal insulation effect of the material, reducing heat absorption, and further improving the thermal insulation performance of the material; the silica aerogel with high porosity, low thermal conductivity and high strength can ensure the excellent thermal insulation performance and high shape stability of the thermal insulation material.

As a mesh structure, the glass fiber mesh with good tensile strength can improve the strength of the thermal insulation material and can further give the thermal insulation material a certain impact resistance and corrosion resistance. Because a high-silica fiber shows excellent performance in strength, high-temperature resistance and thermal insulation, use of the high-silica fiber mesh as the reinforcement mesh can improve the strength and thermal insulation effect of the thermal insulation material; the metal mesh with high mechanical strength and compressive strength can effectively improve the use strength of the thermal insulation material.

In a specific implementable solution, a bulk density of the fumed silica is 20-100 g/m$^3$.

According to the above technical solution, the bulk density of the fumed silica affects the thermal insulation efficiency thereof. The smaller the bulk density, the lower the thermal conductivity of the fumed silica, the better the thermal insulation effect. However, if the bulk density is too low, the fumed silica will easily float due to being too light, thus affecting a quality of a finished product when used for preparation of a thermal insulation material.

In a specific implementable solution, the light-screening agent is at least one selected from a group consisting of silicon carbide, carbon black, zirconium oxide, graphite and graphene, and a particle size of the light-screening agent is 0.01-15 μm.

According to the above technical solution, the silicon carbide can significantly reduce heat transfer of infrared radiation and effectively improve the high-temperature thermal insulation performance of the material; as a black inorganic pigment, the carbon black with good covering power and a large specific surface area can effectively improve the light-shielding and light-absorbing effects and achieve the purpose of thermal insulation; the zirconium oxide with excellent high-temperature resistance and a high refractive index can effectively improve the thermal insulation effect of the material; the graphite and graphene with a large specific surface area can effectively absorb infrared radiation and reduce the heat conduction of the material, thereby ensuring that the thermal insulation material has excellent thermal insulation performance.

In a specific implementable solution, the particle size of the silicon carbide is 3-5 μm.

According to the above technical solution, the smaller the particle size of silicon carbide, the greater the surface area, and the silicon carbide with a smaller particle size has more interfaces that can hinder heat conduction; moreover, the silicon carbide with the smaller particle size can also be evenly distributed in the material, thereby reducing the pores and air in the material and improving thermal insulation performance. However, use of the silicon carbide with a too small particle size will increase production cost and cause the finished product to be unstable in quality. Therefore, by limiting the particle size of the silicon carbide, the silicon carbide can stably exert the thermal insulation performance thereof.

In a specific implementable solution, the fiber is at least one selected from a group consisting of a glass fiber, a high-silica fiber, and a carbon fiber, and a diameter of the fiber is 3-15 μm and a length of the fiber is 5-20 mm;

According to the above technical solution, the smaller the diameter of the fiber, the smaller the internal pores, and the more tortuous the path of heat transfer, thus improving the thermal insulation effect of the material; shorter fibers can be more easily dispersed in the material, but the fibers are more likely to break, fold and age under high temperature conditions, thereby affecting the high-temperature resistance. Longer fibers have higher tensile strength and modulus and can maintain better strength and stability at high temperatures. However, the longer fibers are more difficultly dispersed in the material and are more likely to agglomerate. The long fibers may even extend out of a material system and are easily pulled out, thereby causing a reduction of stability in subsequent use. By limiting the diameter and length of the fiber, the fiber can be stably present in the material system and can play a good thermal insulation effect.

In a specific implementable solution, the fiber includes the glass fiber, the high-silica fiber and the carbon fiber in a weight ratio of (1-2):(2-3):1.

According to the above technical solution, the glass fiber, the high-silica fiber and the carbon fiber all have excellent high-temperature resistance. However, compared with the carbon fiber, the glass fiber has lower tensile strength, higher brittleness and lower wear resistance, but excellent heat resistance, light weight and lower cost. Mechanical properties and chemical stability of the carbon fiber are easily affected at high temperatures, and high temperatures will accelerate the oxidation and failure process of the carbon fiber. Compared with the glass fiber, the high-silica fiber has better heat resistance, wear resistance, and chemical corrosion resistance; however, the glass fiber has better strength, flexibility and insulation. In view of this, by use of the above three fibers in combination in a specific ratio, the thermal insulation material can achieve better use performance.

In a specific implementable solution, the carbon fiber is coated with a polyamide acid coating on a surface thereof, and the carbon fiber coated with the polyamide acid coating is specifically prepared by:

dissolving pyromellitic dianhydride and diaminodiphenyl ether in N,N-dimethylamide for reaction in a presence of nitrogen, then adjusting a value of pH to 9 with ammonia water to obtain a mixing solution, impregnating a carbon fiber with the mixing solution, and then drying and dispersing the carbon fiber to obtain the carbon fiber coated with the polyamide acid coating.

According to the above technical solution, the carbon fiber is prone to oxidation and failure at high temperatures. By coating the surface of the carbon fiber with the polyamide acid coating, the polyamide acid coating containing temperature-resistant acylamino groups improves the thermal stability of the carbon fiber, slows down the oxidation and failure process of the carbon fiber, thereby causing the thermal insulation material to have a long-lasting thermal insulation effect. In addition, the fumed silica has insufficient surface coordination, large specific surface area and surface hypoxia. In the preparation of the thermal insulation material, a bonding effect can be formed between the fumed silica and the carbon fiber, thereby reducing the powder loss and low split strength of the thermal insulation layer and ensuring the long-lasting thermal insulation effect of the thermal insulation layer.

In a specific implementable solution, a thickness of the thermal insulation material is 0.3-2 mm and specifically may be 0.3 mm, 0.4 mm, 0.5 mm, 0.6 mm, 0.7 mm, 1 mm, 1.2 mm, 1.4 mm, 1.5 mm, 1.6 mm, 1.8 mm or 2 mm.

In a specific implementable solution, a flame retardant resin layer is provided on a surface of each of the thermal insulation layer.

In a specific implementable solution, a coating thickness of the flame retardant resin layer is 20-100 μm and specifically may be 20 μm, 30 μm, 50 μm, 70 μm, 90 μm or 100 μm.

According to the above technical solution, coating the flame retardant resin layer on the surface of the thermal insulation layer can play a packaging role, further reduce an occurrence of powder loss, and further achieve certain flame retardance.

In a second aspect, the present application provides a method for preparing the nano-silica composite thermal insulation material and adopts the following technical solution.

The method for preparing the nano-silica composite thermal insulation material includes the following steps:
- accurately weighing the raw materials of the thermal insulation layer and mixing the raw materials adequately;
- laying a first layer of the raw materials of the thermal insulation layer, spraying the inorganic binder on the first layer of the raw materials of the thermal insulation layer, laying the reinforcement mesh on the first layer of the raw materials of the thermal insulation layer, spraying the inorganic binder on the reinforcement mesh, and then laying a second layer of the raw materials of the thermal insulation layer on the reinforcement mesh to obtain a semi-finished product; and
- pressing the semi-finished product with a pressure of 0.001-0.2 MPa firstly, and then increasing the pressure to 1-5 MPa at a rate of 0.1-0.3 MPa/min for pressing, thus obtaining the nano-silica composite thermal insulation material after molding.

According to the above technical solution, the thermal insulation layers are molded by way of pressing, avoiding the use of glue. During a pressing process, the material is firstly pressed at a low pressure to preliminarily expel the air out of the material, and then pressed at a high pressure to further expel a residual air and mold the thermal insulation layers. If the material is pressed with a high pressure at one time, the air in the material cannot be expelled timely and forms pores, and the pores will reduce the thermal insulation performance of the material. By adopting the method of the present application, the above problem will be reduced.

In summary, the present application achieves at least one of the following beneficial technical effects.

In the present application, the nano-silica, the light-screening agent and the fiber are used to give the thermal insulation material excellent thermal insulation performance; moreover, the reinforcement mesh is used to ensure that the thermal insulation material has excellent use strength; the thermal insulation layers and the reinforcement mesh are bonded by the inorganic binder, avoiding the use of glue, maintaining natural pores of nano-silica so that the nano-silica exerts the thermal insulation effect effectively. In this way, the thermal insulation materials achieves advantages of high thermal insulation and high strength.

The present applications selects the fiber with specific diameter and length so that the fiber can be present stably in the material system, and can effectively combine with the light-screening agent and the nano-silica to form a thermal insulation layer. In this way, the thermal insulation material achieves an excellent thermal insulation effect and a long service life.

According to the present application, in the preparation of the thermal insulation material, the material is pressed step by step for molding. Firstly, the material is pressed at a relatively low pressure to expel the air contained in the material, and then the material is pressed and molded at a relatively high pressure so that the raw materials in the thermal insulation material can be closely connected, thereby reducing pores and effectively ensuring the thermal insulation performance of the thermal insulation material.

DETAILED DESCRIPTION

The present application is further described in detail in conjunction with Examples below.

Preparation Example 1

Pyromellitic anhydride and diaminodiphenyl ether were dissolved, in a molar ratio of 1:1, in N,N-dimethylformamide for reaction for 2 h at 5° C. in the presence of nitrogen to obtain a polyamide acid solution, a mass fraction of polyamide acid in the polyamide acid solution was 10%; ammonia water was then added to adjust a value of pH of the solution to 9, and excess ammonia water was then removed under a ventilation condition; deionized water was then added to the solution to obtain an aqueous polyamide acid solution, the mass fraction of polyamide acid in the aqueous polyamide acid solution was 0.5%. Carbon fiber was impregnated in the aqueous polyamide acid solution and then dried and dispersed to obtain a carbon fiber coated with a polyamide acid coating.

Example 1

Provided was a nano-silica composite thermal insulation material, including a reinforcement mesh and thermal insulation layers arranged on two sides of the reinforcement mesh. The reinforcement mesh was a glass fiber mesh with a gram weight of 30 g/m². The thermal insulation layer included 60 g of fumed silica, 15 g of silicon carbide and 1 g of high-silica fiber. The bulk density of the fumed silica was 50 g/m³, the particle size of the silicon carbide was 3 μm, and the high-silica fiber had a diameter of 8 μm and a length of 10 mm.

In the preparation process, the fumed silica, the silicon carbide and the high-silica fiber were accurately weighed and adequately dispersed to obtain a material;
- two portions were taken out of said material, 30 g each;
- 30 g of said material was laid flat in a 310 mm*310 mm square mold, shaken and flattened, and a sodium water glass solution with a modulus of 3 was then sprayed on the surface of the material, with a spraying amount of 40 g/m²;
- a glass fiber mesh was laid on the material and the sodium water glass solution was then sprayed on the surface of the glass fiber mesh, with a spraying amount of 40 g/m²; and the other 30 g of said material was laid on the surface of the glass fiber mesh;
- a layer of release film was laid on the surface of each of the material laid flat to obtain a semi-finished product;

the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Example 2

Provided was a nano-silica composite thermal insulation material, including a reinforcement mesh and thermal insulation layers arranged on two sides of the reinforcement mesh. The reinforcement mesh was a glass fiber mesh with a gram weight of 30 $g/m^2$. The thermal insulation layer included 70 g of fumed silica, 30 g of silicon carbide and 5 g of high-silica fiber. The bulk density of the fumed silica was 50 $g/m^3$, the particle size of the silicon carbide was 3 μm, and the high-silica fiber had a diameter of 8 μm and a length of 10 mm.

In the preparation process, the fumed silica, the silicon carbide and the high-silica fiber were accurately weighed and adequately dispersed to obtain a material;

two portions were taken out of said material, 30 g each; 30 g of said material was laid flat in a 310 mm*310 mm square mold, shaken and flattened, and a sodium water glass solution with a modulus of 3 was then sprayed on the surface of the material, with a spraying amount of 40 $g/m^2$;

a glass fiber mesh was laid on the material and the sodium water glass solution was then sprayed on the surface of the glass fiber mesh, with a spraying amount of 40 $g/m^2$; and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Example 3

Provided was a nano-silica composite thermal insulation material, including a reinforcement mesh and thermal insulation layers arranged on two sides of the reinforcement mesh. The reinforcement mesh was a glass fiber mesh with a gram weight of 30 $g/m^2$. The thermal insulation layer included 90 g of fumed silica, 35 g of silicon carbide and 10 g of high-silica fiber. The bulk density of the fumed silica was 50 $g/m^3$, the particle size of the silicon carbide was 3 μm, and the high-silica fiber had a diameter of 8 μm and a length of 10 mm.

In the preparation process, the fumed silica, the silicon carbide and the high-silica fiber were accurately weighed and adequately dispersed to obtain a material;

two portions were taken out of said material, 30 g each; 30 g of said material was laid flat in a 310 mm*310 mm square mold, shaken and flattened, and a sodium water glass solution with a modulus of 3 was then sprayed on the surface of the material, with a spraying amount of 40 $g/m^2$;

a glass fiber mesh was laid on the material and the sodium water glass solution was then sprayed on the surface of the glass fiber mesh, with a spraying amount of 40 $g/m^2$; and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Examples 4-7

Examples 4-7 only differ from Example 2 in the amount of said material used and the thickness of a finished product (the nano-silica composite thermal insulation material) as follows:

in Example 4, two portions of said material were taken, 22 g each, and the thickness of the finished product was 1.4 mm;

in Example 5, two portions of said material were taken, 10 g each, and the thickness of the finished product was 0.7 mm;

in Example 6, two portions of said material were taken, 9 g each, and the thickness of the finished product was 0.6 mm;

in Example 7, two portions of said material were taken, 6 g each, and the thickness of the finished product was 0.4 mm.

Examples 8-11

Examples 8-11 only differ from Example 2 in the bulk density of the fumed silica used as follows:

in Example 8, the bulk density of the fumed silica was 20 $g/m^3$;

in Example 9, the bulk density of the fumed silica was 100 $g/m^3$;

in Example 10, the bulk density of the fumed silica was 5 $g/m^3$;

in Example 11, the bulk density of the fumed silica was 200 $g/m^3$.

Example 12

Provided was a nano-silica composite thermal insulation material, including a reinforcement mesh and thermal insulation layers arranged on two sides of the reinforcement mesh. The reinforcement mesh was a glass fiber mesh with a gram weight of 30 $g/m^2$. The thermal insulation layer included 70 g of silica aerogel, 30 g of silicon carbide and 5 g of high-silica fiber. The particle size of the silicon carbide was 3 μm, and the high-silica fiber had a diameter of 8 μm and a length of 10 mm.

In the preparation process, the fumed silica, the silicon carbide and the high-silica fiber were accurately weighed and adequately dispersed to obtain a material;

two portions were taken out of said material, 30 g each; 30 g of said material was laid flat in a 310 mm*310 mm square mold, shaken and flattened, and a sodium water glass solution with a modulus of 3 was then sprayed on the surface of the material, with a spraying amount of 40 $g/m^2$;

a glass fiber mesh was laid on the material and the sodium water glass solution was then sprayed on the surface of the glass fiber mesh, with a spraying amount of 40 g/m², and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Examples 13-17

Examples 13-17 only differ from Example 2 in the particle size of the silicon carbide as follows:
in Example 10, the particle size of the silicon carbide was 0.01 μm;
in Example 14, the particle size of the silicon carbide was 5 μm;
in Example 15, the particle size of the silicon carbide was 10 μm;
in Example 16, the particle size of the silicon carbide was 15 μm;
in Example 17, the particle size of the silicon carbide was 30 μm.

Examples 18-25

Examples 18-25 only differ from Example 2 in the specifications of the high-silica fiber as follows:
in Example 18, the diameter of the high-silica fiber was 1 μm;
in Example 19, the diameter of the high-silica fiber was 3 μm;
in Example 20, the diameter of the high-silica fiber was 15 μm;
in Example 21, the diameter of the high-silica fiber was 30 μm;
in Example 22, the length of the high-silica fiber was 1 mm;
in Example 23, the length of the high-silica fiber was 5 mm;
in Example 24, the length of the high-silica fiber was 20 mm;
in Example 25, the length of the high-silica fiber was 35 mm.

Example 26

Provided was a nano-silica composite thermal insulation material, including a reinforcement mesh and thermal insulation layers arranged on two sides of the reinforcement mesh. The reinforcement mesh was a glass fiber mesh with a gram weight of 30 g/m². The thermal insulation layer included 70 g of fumed silica, 30 g of silicon carbide and 5 g of glass fiber. The bulk density of the fumed silica was 50 g/m³, the particle size of the silicon carbide was 3 μm, and the glass fiber had a diameter of 8 μm and a length of 10 mm.

In the preparation process, the fumed silica, the silicon carbide and the glass fiber were accurately weighed and adequately dispersed to obtain a material;
two portions were taken out of said material, 30 g each;
30 g of said material was laid flat in a 310 mm*310 mm square mold, shaken and flattened, and a sodium water glass solution with a modulus of 3 was then sprayed on the surface of the material, with a spraying amount of 40 g/m²;

a glass fiber mesh was laid on the material and the sodium water glass solution was then sprayed on the surface of the glass fiber mesh, with a spraying amount of 40 g/m²; and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Example 27

Provided was a nano-silica composite thermal insulation material, including a reinforcement mesh and thermal insulation layers arranged on two sides of the reinforcement mesh. The reinforcement mesh was a glass fiber mesh with a gram weight of 30 g/m². The thermal insulation layer included 70 g of fumed silica, 30 g of silicon carbide and 5 g of carbon fiber. The bulk density of the fumed silica was 50 g/m³, the particle size of the silicon carbide was 3 μm, and the carbon fiber had a diameter of 8 μm and a length of 10 mm.

In the preparation process, the fumed silica, the silicon carbide and the glass fiber were accurately weighed and adequately dispersed to obtain a material;
two portions were taken out of said material, 30 g each;
30 g of said material was laid flat in a 310 mm*310 mm square mold, shaken and flattened, and a sodium water glass solution with a modulus of 3 was then sprayed on the surface of the material, with a spraying amount of 40 g/m²;

a glass fiber mesh was laid on the material and the sodium water glass solution was then sprayed on the surface of the glass fiber mesh, with a spraying amount of 40 g/m²; and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Example 28

Provided was a nano-silica composite thermal insulation material, including a reinforcement mesh and thermal insulation layers arranged on two sides of the reinforcement mesh. The reinforcement mesh was a glass fiber mesh with a gram weight of 30 g/m². The thermal insulation layer included 70 g of fumed silica, 30 g of silicon carbide and 5 g of fiber. The bulk density of the fumed silica was 50 g/m³, the particle size of the silicon carbide was 3 μm, the fiber was composed of glass fiber and high-silica fiber in a mass ratio of 1:2, and the fiber had a diameter of 8 μm and a length of 10 mm.

In the preparation process, the fumed silica, the silicon carbide, the glass fiber and the high-silica fiber were accurately weighed and adequately dispersed to obtain a material;

two portions were taken out of said material, 30 g each; 30 g of said material was laid flat in a 310 mm*310 mm square mold, shaken and flattened, and a sodium water glass solution with a modulus of 3 was then sprayed on the surface of the material, with a spraying amount of 40 g/m$^2$;

a glass fiber mesh was laid on the material and the sodium water glass solution was then sprayed on the surface of the glass fiber mesh, with a spraying amount of 40 g/m$^2$; and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Example 29

Provided was a nano-silica composite thermal insulation material, including a reinforcement mesh and thermal insulation layers arranged on two sides of the reinforcement mesh. The reinforcement mesh was a glass fiber mesh with a gram weight of 30 g/m$^2$. The thermal insulation layer included 70 g of fumed silica, 30 g of silicon carbide and 5 g of fiber. The bulk density of the fumed silica was 50 g/m$^3$, the particle size of the silicon carbide was 3 μm, the fiber was composed of high-silica fiber and carbon fiber in a mass ratio of 2:1, and the fiber had a diameter of 8 μm and a length of 10 mm.

In the preparation process, the fumed silica, the silicon carbide, the high-silica fiber and the carbon fiber were accurately weighed and adequately dispersed to obtain a material;

two portions were taken out of said material, 30 g each; 30 g of said material was laid flat in a 310 mm*310 mm square mold, shaken and flattened, and a sodium water glass solution with a modulus of 3 was then sprayed on the surface of the material, with a spraying amount of 40 g/m$^2$;

a glass fiber mesh was laid on the material and the sodium water glass solution was then sprayed on the surface of the glass fiber mesh, with a spraying amount of 40 g/m$^2$; and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Example 30

Provided was a nano-silica composite thermal insulation material, including a reinforcement mesh and thermal insulation layers arranged on two sides of the reinforcement mesh. The reinforcement mesh was a glass fiber mesh with a gram weight of 30 g/m$^2$. The thermal insulation layer included 70 g of fumed silica, 30 g of silicon carbide and 5 g of fiber. The bulk density of the fumed silica was 50 g/m$^3$, the particle size of the silicon carbide was 3 μm, the fiber was composed of glass fiber, high-silica fiber and carbon fiber in a mass ratio of 1:2:1, and the fiber had a diameter of 8 μm and a length of 10 mm.

In the preparation process, the fumed silica, the silicon carbide, the glass fiber, the high-silica fiber and the carbon fiber were accurately weighed and adequately dispersed to obtain a material;

two portions were taken out of said material, 30 g each; 30 g of said material was laid flat in a 310 mm*310 mm square mold, shaken and flattened, and a sodium water glass solution with a modulus of 3 was then sprayed on the surface of the material, with a spraying amount of 40 g/m$^2$;

a glass fiber mesh was laid on the material and the sodium water glass solution was then sprayed on the surface of the glass fiber mesh, with a spraying amount of 40 g/m$^2$; and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain a nano-silica composite thermal insulation material with a thickness of 2 mm.

Example 31

Provided was a nano-silica composite thermal insulation material, including a reinforcement mesh and thermal insulation layers arranged on two sides of the reinforcement mesh. The reinforcement mesh was a glass fiber mesh with a gram weight of 30 g/m$^3$. The thermal insulation layer included 70 g of fumed silica, 30 g of silicon carbide and 5 g of fiber. The bulk density of the fumed silica was 50 g/m$^3$, the particle size of the silicon carbide was 3 μm, the fiber was composed of glass fiber, high-silica fiber and carbon fiber in a mass ratio of 2:3:1, and the fiber had a diameter of 8 μm and a length of 10 mm.

In the preparation process, the fumed silica, the silicon carbide, the glass fiber, the high-silica fiber and the carbon fiber were accurately weighed and adequately dispersed to obtain a material;

two portions were taken out of said material, 30 g each; 30 g of said material was laid flat in a 310 mm*310 mm square mold, shaken and flattened, and a sodium water glass solution with a modulus of 3 was then sprayed on the surface of the material, with a spraying amount of 40 g/m$^2$;

a glass fiber mesh was laid on the material and the sodium water glass solution was then sprayed on the surface of the glass fiber mesh, with a spraying amount of 40 g/m$^2$; and the other 30 g of said material was laid on the surface of the glass fiber mesh;

a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Example 32

Provided was a nano-silica composite thermal insulation material, including a reinforcement mesh and thermal insulation layers arranged on two sides of the reinforcement mesh. The reinforcement mesh was a glass fiber mesh with a gram weight of 30 g/m$^2$. The thermal insulation layer included 70 g of fumed silica, 30 g of silicon carbide and 5 g of fiber. The bulk density of the fumed silica was 50 g/m$^3$, the particle size of the silicon carbide was 3 μm, the fiber was composed of glass fiber, high-silica fiber and carbon fiber in a mass ratio of 1:2:4, and the fiber had a diameter of 8 μm and a length of 10 mm.

In the preparation process, the fumed silica, the silicon carbide, the glass fiber, the high-silica fiber and the carbon fiber were accurately weighed and adequately dispersed to obtain a material;
- two portions were taken out of said material, 30 g each;
- 30 g of said material was laid flat in a 310 mm*310 mm square mold, shaken and flattened, and a sodium water glass solution with a modulus of 3 was then sprayed on the surface of the material, with a spraying amount of 40 g/m$^2$;
- a glass fiber mesh was laid on the material and the sodium water glass solution was then sprayed on the surface of the glass fiber mesh, with a spraying amount of 40 g/m$^2$; and the other 30 g of said material was laid on the surface of the glass fiber mesh;
- a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened to obtain the nano-silica composite thermal insulation material with a thickness of 2 mm.

Examples 33-37

Examples 33-37 only differ from Example 2 in the pressing conditions for the semi-finished product after the semi-finished product was placed in a mold of a pressing machine as follows:
- in Example 33, a layer of release film was laid on the surface of each of the material laid flat to obtain a semi-finished product; the semi-finished product was then placed in a mold of a pressing machine and pressed in vacuum for 60 s with a pressure of 0.001 MPa; the pressure was then increased to 1 MPa at a rate of 0.1 MPa/min and held for 120 s; then, the mold was opened to obtain the nano-silica composite thermal insulation material;
- in Example 34, a layer of release film was laid on the surface of each of the material laid flat to obtain a semi-finished product; the semi-finished product was then placed in a mold of a pressing machine and pressed in vacuum for 60 s with a pressure of 0.2 MPa; the pressure was then increased to 5 MPa at a rate of 0.3 MPa/min and held for 120 s; then, the mold was opened to obtain the nano-silica composite thermal insulation material;
- in Example 35, a layer of release film was laid on the surface of each of the material laid flat to obtain a semi-finished product; the semi-finished product was then placed in a mold of a pressing machine and pressed in vacuum for 60 s with a pressure of 2 MPa; the pressure was then increased to 5 MPa at a rate of 0.2 MPa/min and held for 120 s; then, the mold was opened to obtain the nano-silica composite thermal insulation material;
- in Example 36, a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 1 MPa/min and held for 120 s; then, the mold was opened to obtain the nano-silica composite thermal insulation material;
- in Example 37, a layer of release film was laid on the surface of each of the material laid flat to obtain a semi-finished product; the semi-finished product was then placed in a mold of a pressing machine and pressed in vacuum for 180 s with a pressure of 2 MPa; then, the mold was opened to obtain the nano-silica composite thermal insulation material.

Example 38

Provided was a nano-silica composite thermal insulation material, including a reinforcement mesh and thermal insulation layers arranged on two sides of the reinforcement mesh. A flame retardant resin layer was provided on each of the thermal insulation layer. The reinforcement mesh was a glass fiber mesh with a gram weight of 30 g/m$^2$. The thermal insulation layer included 70 g of fumed silica, 30 g of silicon carbide and 5 g of high-silica fiber. The bulk density of the fumed silica was 50 g/m$^3$, the particle size of the silicon carbide was 3 μm, and the high-silica fiber had a diameter of 8 μm and a length of 10 mm. The flame retardant resin layer was a vinyl resin layer, and the vinyl resin was purchased from Langfang Wanteng Anticorrosion Materials Co., Ltd., with a model of FX-450.

In the preparation process, the fumed silica, the silicon carbide and the high-silica fiber were accurately weighed and adequately dispersed to obtain a material;
- two portions were taken out of said material, 22 g each;
- 22 g of said material was laid flat in a 310 mm*310 mm square mold, shaken and flattened, and a sodium water glass solution with a modulus of 3 was then sprayed on the surface of the material, with a spraying amount of 40 g/m$^2$;
- a glass fiber mesh was laid on the material and the sodium water glass solution was then sprayed on the surface of the glass fiber mesh, with a spraying amount of 40 g/m$^2$; and the other 22 g of said material was laid on the surface of the glass fiber mesh;
- a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened, a flame retardant resin layer with a thickness of 50 μm was applied to each side of a resulting product, and after the flame retardant resin layers were cured, the nano-silica composite thermal insulation material was obtained.

Example 39

This example differs from Example 27 in that the carbon fiber used was the carbon fiber coated with the polyamide acid coating prepared in Preparation Example 1.

Comparative Example 1

A ceramic fiber aerogel felt with a thickness of 2 mm was used as comparative example 1, wherein the specific model of the ceramic fiber aerogel felt was FRA-C650.

Comparative Example 2

A ceramic fiber aerogel sheet with a thickness of 2 mm was used as comparative example 2, wherein the specific model of the ceramic fiber aerogel sheet was AJ1200.

Comparative Example 3

A pre-oxidized fiber aerogel felt with a thickness of 1.4 mm was used as comparative example 3, wherein the specific model of the pre-oxidized fiber aerogel felt was FRA-PC350.

Comparative Example 4

A wet-process glass fiber aerogel felt with a thickness of 1.4 mm was used as comparative example 4, wherein the specific model of the wet-process glass fiber aerogel felt was FRA-G600.

Comparative Example 5

Provided was a nano-silica composite thermal insulation material. In the preparation process, 70 g of fumed silica, 30 g of silicon carbide, 5 g of high-silica fiber and 30 g of 801 glue were weighed accurately; the 801 glue was dispersed in 250 g of water firstly, and then the fumed silica, the silicon carbide and the high-silica fiber was added and adequately dispersed to obtain a material;
- two portions were taken out of said material, 30 g each; 30 g of said material was laid flat in a 310 mm*310 mm square mold and flattened to a thickness of 1 mm; a glass fiber mesh with a gram weight of 30 g/m² was laid on the material; the other portion of said material was then laid on the surface of the glass fiber mesh and flattened to a thickness of 1 mm;
- a layer of release film was laid on the surface of each of the material laid flat to obtain a semi-finished product; the semi-finished product was then placed in a mold of a pressing machine and pressed in vacuum for 60 s with a pressure of 0.1 MPa; the pressure was then increased to 2 MPa at a rate of 0.2 MPa/min and held for 120 s; then, the mold was opened and the product was placed in an oven to dry out excess moisture to obtain the nano-silica composite thermal insulation material.

Performance Test

Figure 1:
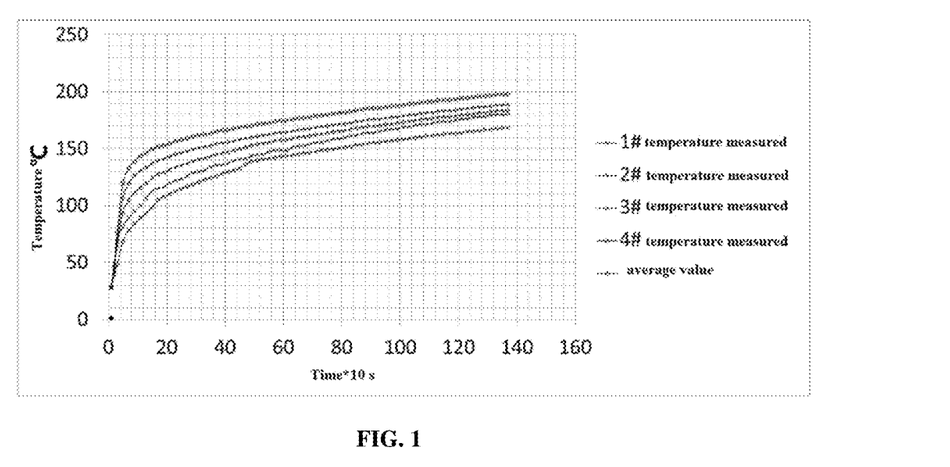
FIG. 1 shows test results of a sample in Example 2.
Figure 2:
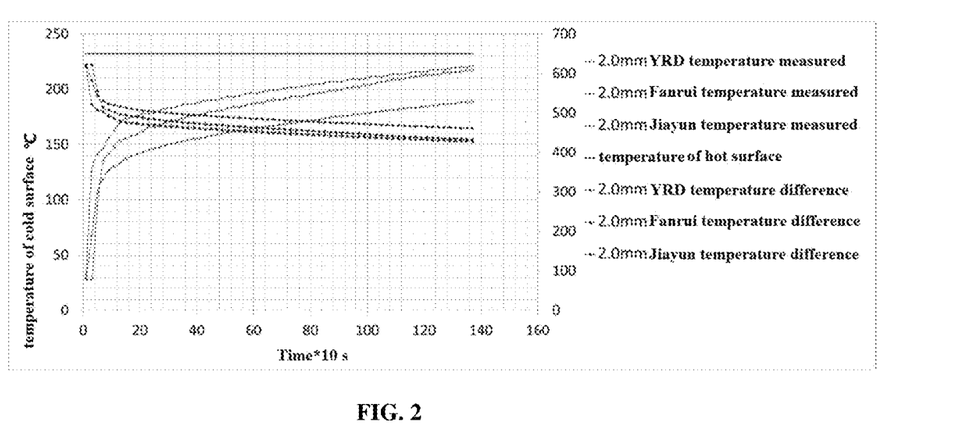
FIG. 2 shows comparison of test results of samples in Example 2, Comparative Example 1 and Comparative Example 2.

Test 1: The nano-silica composite thermal insulation material with the thickness of 2 mm in Example 2, the ceramic fiber aerogel felt in Comparative Example 1, and the ceramic fiber aerogel sheet in Comparative Example 2 were selected as samples. The samples were placed on a high-temperature heating plate. A surface of the samples in contact with the high-temperature heating plate was designated a hot surface, and a surface away from the hot surface was a cold surface. Four temperature sensors were randomly arranged between each sample and the high-temperature heating plate to record the temperature of the hot surface. Four temperature sensors were correspondingly arranged on the cold surface of each sample to record the temperature of the cold surface. The temperature of the high-temperature heating plate was raised to 650° C. and held, the pressure was 0.45 MP, the sensor temperatures of the hot and cold surfaces were recorded every 10 s, and the average temperature of the cold surface and the temperature difference between the cold and hot surfaces were calculated. Results are shown in FIGS. 1 and 2. FIG. 1 shows test results of the sample in Example 2, and FIG. 2 shows the comparison of the test results of three samples.

Referring to FIGS. 1 and 2, 1 #, 2 #, 3 #, and 4 # in FIG. 1 respectively are the temperatures measured by four temperature sensors, YRD in FIG. 2 refers to the sample in Example 2, Fanrui refers to the sample in Comparative Example 1, and Jiayun refers to the sample in Comparative Example 2. It can be seen from the figures that a rise rate of the temperature of the cold surface of the nano-silica composite thermal insulation material prepared in the present application is much lower than that of Comparative Example 1 and Comparative Example 2, and the temperature difference between the hot surface and the cold surface is also greater than that of Comparative Example 1 and Comparative Example 2, indicating that the nano-silica composite thermal insulation material in the present application has excellent thermal insulation performance.

Figure 3:
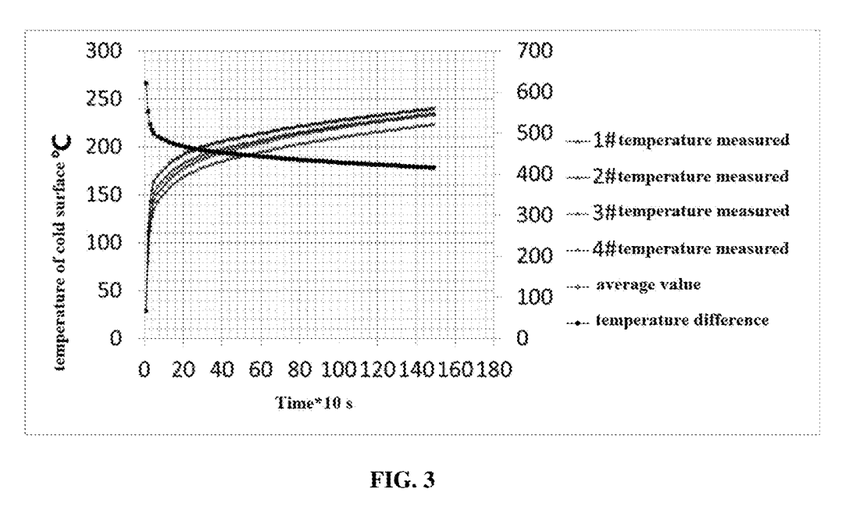
FIG. 3 shows test results of a sample in Example 4.
Figure 4:
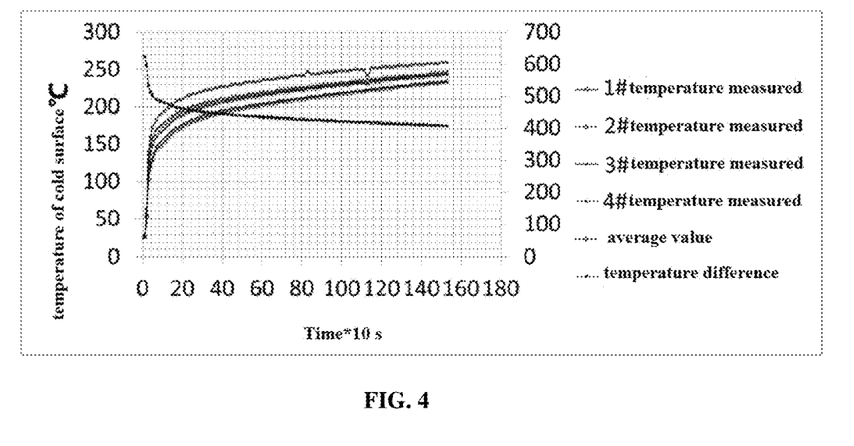
FIG. 4 shows test results of a sample in Example 38.
Figure 5:
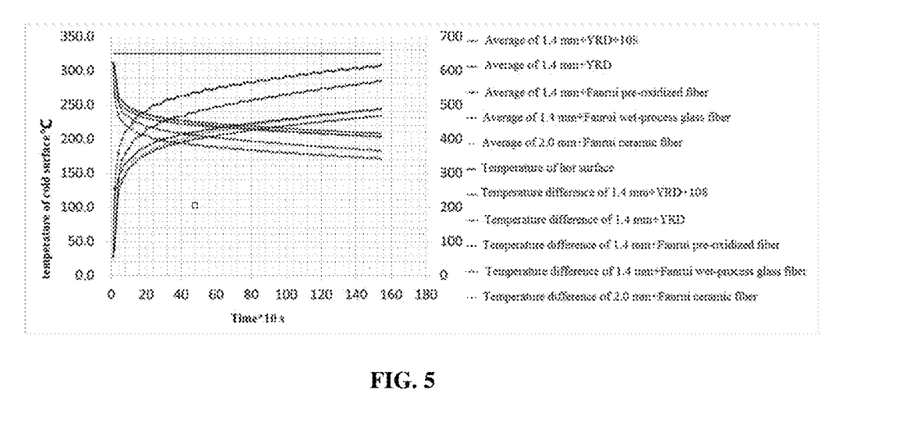
FIG. 5 shows comparison of test results of samples in Example 4, Example 38, Comparative Example 1, Comparative Example 3 and Comparative Example 4.

Test 2: the nano-silica composite thermal insulation material with the thickness of 1.4 mm in Example 4, the nano-silica composite thermal insulation material in Example 38, the ceramic fiber aerogel felt in Comparative Example 1, the pre-oxidized fiber aerogel felt in Comparative Example 3, and the wet-process glass fiber aerogel felt in Comparative Example 4 were selected as samples. The five samples were placed on a high-temperature heating plate separately. A surface of the samples in contact with the high-temperature heating plate was designated a hot surface, and a surface away from the hot surface was a cold surface. Four temperature sensors were randomly arranged between each sample and the high-temperature heating plate to record the temperature of the hot surface. Four temperature sensors were correspondingly arranged on the cold surface of each sample to record the temperature of the cold surface. The temperature of the high-temperature heating plate was raised to 650° C. and held, the pressure was 0.45 MP, the sensor temperatures of the hot and cold surfaces were recorded every 10 s, and the average temperature of the cold surface and the temperature difference between the cold and hot surfaces were calculated. Results are shown in FIGS. 3-5. FIG. 3 shows the test results of the sample in Example 4, and FIG. 4 shows the test results of the sample in Example 38. In FIGS. 3 and 4, 1 #, 2 #, 3 #, and 4 # respectively are the temperatures measured by four temperature sensors; FIG. 5 shows comparison of the test results of the five samples, in which "average of 1.4 mm+YRD+108" and "temperature difference of 1.4 mm+YRD+108" respectively refer to the average temperature of the cold surface of the sample in Example 38 and the temperature difference between the hot surface and the cold surface of the sample in Example 38, "average of 1.4 mm+YRD" and "temperature difference of 1.4 mm+YRD" respectively refer to the average temperature of the cold surface of the sample in Example 4 and the temperature difference between the hot surface and the cold surface of the sample in Example 4, "average of 1.4 mm+Fanrui pre-oxidized fiber" and "temperature difference of 1.4 mm+Fanrui pre-oxidized fiber" respectively refer to the average temperature of the cold surface of the sample in Comparative Example 3 and the temperature difference between the hot surface and the cold surface of the sample in Comparative Example 3, "average of 1.4 mm+Fanrui wet-process glass fiber" and "temperature difference of 1.4 mm+Fanrui wet-process glass fiber" respectively refer to the average temperature of the cold surface of the sample in Comparative Example 4 and the temperature difference between the hot surface and the cold surface of the sample in Comparative Example 4, and "average of 2.0 mm+Fanrui ceramic fiber" and "temperature difference of 2.0 mm+Fanrui ceramic fiber" respectively refer to the average temperature of the cold surface of the sample in Comparative Example 1 and the temperature difference between the hot surface and the cold surface of the sample in Comparative Example 1.

As shown in FIGS. 3 to 5, a rise rate of the temperature of the cold surface of the sample in Example 4 is the lowest, indicating that the thermal insulation material of the present application has excellent thermal insulation performance. The sample in Example 4, even with less thickness than the sample in Comparative Example 1, still presents a good thermal insulation effect. Based on the comparison between Example 4 and Example 38, it can be seen that, after the flame retardant resin layer was applied to the surface of each of the thermal insulation layer, the thermal insulation effect of the thermal insulation material was relatively reduced. Analysis shows that the flame retardant resin is mainly used for flame retardance and for preventing powder loss, so the thermal insulation effect of Example 38 is not as good as that of Example 4. However, according to FIG. 5, although the rise rate of the temperature of the sample in Example 38 is higher than that of the sample in Comparative Example 1 at a beginning of temperature rise, as time goes on, the rise rate of the temperature of the sample in Example 38 gradually becomes lower than that of the sample in Comparative Example 1, indicating that the thermal insulation material of the present application can maintain a long-lasting thermal insulation effect and has a long service life.

Test 3: High-temperature resistance test: Samples were treated with 1200° C. flame from a flamethrower, and observed to record the time when the samples were burned through.

Test 4: Same in Example 2, Examples 18-32, and Example 39 were tested for tensile strength according to GB/T17911-2006.

Test 5: Powder loss rate test: Samples in Example 2, Example 4, Examples 8-11, Examples 18-25, Example 27, Example 38 and Example 39 were selected; the samples were accurately weighed and then shaken in a vibrating screen with a vibration frequency of 1400 times/min and an amplitude of 3 mm. After being shaken for 5 min, the samples were taken out and weighed again to calculate the powder loss rate which is manifested as mass loss rate.

TABLE 1

Test results of Examples 1-8 in Test 3

| Group | Example 1 | Example 2 | Example 3 | Example 4 | Example 5 | Example 6 | Example 7 | Example 8 |
|---|---|---|---|---|---|---|---|---|
| Burn-through resistance time/min | 115 | 118 | 120 | 114 | 109 | 107 | 104 | 121 |

TABLE 2

Test results of Examples 9-16 in Test 3

| Group | Example 9 | Example 10 | Example 11 | Example 12 | Example 13 | Example 14 | Example 15 | Example 16 |
|---|---|---|---|---|---|---|---|---|
| Burn-through resistance time/min | 112 | 109 | 105 | 122 | 113 | 116 | 114 | 112 |

TABLE 3

Test results of Examples 17-25 in Test 3

| Group | Example 17 | Example 18 | Example 19 | Example 20 | Example 21 | Example 22 | Example 23 | Example 24 | Example 25 |
|---|---|---|---|---|---|---|---|---|---|
| Burn-through resistance time/min | 110 | 115 | 124 | 117 | 113 | 111 | 115 | 123 | 113 |

TABLE 4

Test results of Examples 26-33 in Test 3

| Group | Example 26 | Example 27 | Example 28 | Example 29 | Example 30 | Example 31 | Example 32 | Example 33 |
|---|---|---|---|---|---|---|---|---|
| Burn-through resistance time/min | 114 | 105 | 116 | 112 | 110 | 115 | 107 | 115 |

TABLE 5

Test results of Examples 34-39 and Comparative Example 5 in Test 3

| Group | Example 34 | Example 35 | Example 36 | Example 37 | Example 38 | Example 39 | Comparative |
|---|---|---|---|---|---|---|---|
| Burn-through resistance time/min | 125 | 109 | 112 | 105 | 121 | 113 | 87 |

TABLE 6

Test results of Example 2 and Examples 18-24 in Test 4

| Group | Example 2 | Example 18 | Example 19 | Example 20 | Example 21 | Example 22 | Example 23 | Example 24 |
|---|---|---|---|---|---|---|---|---|
| Tensile strength/KPa | 915 | 903 | 910 | 923 | 905 | 901 | 912 | 925 |

TABLE 7

Test results of Examples 25-32 and Example 39 in Test 4

| Group | Example 25 | Example 26 | Example 27 | Example 28 | Example 29 | Example 30 | Example 31 | Example 22 | Example 39 |
|---|---|---|---|---|---|---|---|---|---|
| Tensile strength/KPa | 907 | 920 | 926 | 917 | 921 | 922 | 919 | 924 | 931 |

TABLE 8

Test results of Example 2, Example 4, Examples 8-11, Examples 18-20 in Test 5

| Group | Example 2 | Example 4 | Example 8 | Example 9 | Example 10 | Example 11 | Example 18 | Example 19 | Example 20 |
|---|---|---|---|---|---|---|---|---|---|
| Powder loss rate/% | 0.34 | 0.33 | 0.36 | 0.31 | 0.46 | 0.31 | 0.41 | 0.35 | 0.32 |

TABLE 9

Test results of Examples 21-27, Example 38 and Example 39 in Test 5

| Group | Example 21 | Example 22 | Example 23 | Example 24 | Example 25 | Example 27 | Example 38 | Example 39 |
|---|---|---|---|---|---|---|---|---|
| Powder loss rate/% | 0.29 | 0.36 | 0.30 | 0.35 | 0.38 | 0.33 | 0.15 | 0.26 |

Referring to Table 1-Table 5, compared with Comparative Example 5, the thermal insulation materials in Examples 1-3 show better high-temperature resistance, indicating that the thermal insulation materials can have better thermal insulation performance by referring to the raw materials and the solution of using the inorganic adhesive to bond the thermal insulation layers and the reinforcement layer, as disclosed in the present application. Compared with the solution of using glue to bond the raw materials, the present application uses the thermal insulation layer in which the nano-silica, the light screening agent and the fiber are tightly stacked to achieve thermal insulation performance. The pores in the nano-silica itself can effectively block heat conduction, and during long-term use in the later stage, the thermal insulation layer will not split due to failure and degradation of the glue, thereby ensuring the excellent and long-lasting thermal insulation performance of the thermal insulation material.

In combination with Example 2 and Examples 4-7, as the thickness decreases, the high-temperature resistance of the thermal insulation materials shows a downward trend, indicating that the thickness affects the thermal insulation effect of the thermal insulation materials. The thermal insulation material with less thickness has worse thermal insulation performance.

In combination with Example 2 and Examples 8-11, the bulk density of fumed silica is within a certain range. As the bulk density decreases, the thermal insulation effect of the thermal insulation material increases, which means that the smaller the bulk density of fumed silica, the lower the thermal conductivity of fumed silica, the better the thermal insulation effect. However, from Example 10, it can be seen that if the bulk density is too low, fumed silica is too light and floats easily, and this will adversely affect the quality of the finished product when the fumed silica is used for preparation of the thermal insulation material and reduce the thermal insulation performance of the thermal insulation material.

In combination with Example 2 and Examples 13-17, the particle size of silicon carbide affects the thermal insulation effect of the thermal insulation material in the following way: because a silicon carbide with a smaller particle size has a larger surface area, more interfaces are provided to hinder heat conduction, thereby improving the thermal insulation effect; however, a too small particle size will also reduce the quality of the finished product, causing a reduction in the thermal insulation effect.

Referring to Example 2 and Examples 18-25, the diameter and length of the high-silica fiber may also affect the thermal insulation performance of the thermal insulation material. The smaller the diameter and the shorter the length, the smaller the pores of the fiber and the more evenly dispersed the fiber is in the material, and the thermal insulation effect of the thermal insulation material is thus improved. However, as the length increases, the dispersion of the fiber in the material is adversely affected, and this reduces the quality of the thermal insulation material, which is manifested as a shortened burn-through resistance time.

Referring to Example 2 and Examples 26-32, the glass fiber, the high-silica fiber and the carbon fiber all have good thermal insulation performance. Considering the production cost and the comprehensive performance of the thermal insulation material, it is suggested to combine the glass fiber, the high-silica fiber and the carbon fiber in a specific ratio so that the thermal insulation material has excellent thermal insulation performance and good strength and other properties.

In combination with Example 2 and Examples 33-37, the material was firstly pressed with a relatively low pressure to expel the air out of the material in advance, and then pressed with a relatively high pressure to further expel the air out of the material and mold the material. Compared with a solution of directly pressing the material with a certain pressure, the solution of the present application can effectively reduce the air in the material after molding, thereby ensuring the high thermal insulation effect of the material. In contrast, if the material is pressed with a relatively high pressure at one time, the air in the material cannot be expelled timely and forms pores, and the pores will reduce the thermal insulation performance of the material. In view of this, the pressing method of the present application can ensure the high thermal insulation effect of the material.

In combination with Example 39 and Example 27, coating the surface of the carbon fiber with the polyamide acid coating can improve the thermal stability of the carbon fiber at high temperatures, thereby appropriately extending the burn-through resistance time of the thermal insulation material.

Referring to Table 6 and Table 7, in combination with Example 2 and Examples 18-25, it can be seen that a fiber with a too small diameter is not conducive to mutual entanglement, and the connectivity of the fiber with other raw materials is relatively weak, so the tensile strength is relatively low. However, if the diameter is too large, it may be unfavorable for the dispersion of the fiber in a material system, adversely affecting the tensile strength. Although a longer fiber may improve the tensile strength of the thermal insulation material, if the fiber is too long, it will easily agglomerate in the material system and cannot be dispersed easily, causing a reduction in the tensile strength.

In combination with Examples 26-32, use of a single fiber may ensure an improvement in the tensile strength of the thermal insulation material, but correspondingly the burn-through resistance time will be reduced. Therefore, considering the burn-through resistance time and tensile strength, three types of fibers can be selected for use in combination. In combination with Example 27 and Example 39, coating the surface of the carbon fiber with the polyamide acid coating can also appropriately improve the tensile strength of the thermal insulation material and increase the burn-through resistance time.

Referring to Table 8 and Table 9 and in combination with Example 2 and Examples 8-11, it can be seen that the silicon carbide with a smaller bulk density can improve the thermal insulation effect of the thermal insulation material, but the silicon carbide is too light and floats easily, causing an increase in the powder loss rate.

In combination with Examples 18-25, a fiber with a smaller diameter and less length can be separated from the material system more easily, causing an increase in the powder loss rate of the thermal insulation material. In combination with Example 27 and Example 39, the surface of the carbon fiber is coated with the polyamide acid coating, and the polyamide acid coating can form a bonding effect with the fumed silica, thereby appropriately strengthening the connection between the raw materials and reducing the powder loss rate.

The above are all preferred embodiments of the present application, and a scope of the present application is not limited thereto. Therefore, any equivalent changes made based on the structure, shape, and principle of the present application shall fall within the scope of the present application.

What is claimed is:

1. A nano-silica composite thermal insulation material, comprising a reinforcement mesh and thermal insulation layers arranged on two sides of the reinforcement mesh, the reinforcement mesh and the thermal insulation layers are bonded by an inorganic binder; wherein raw materials of each of the thermal insulation layers comprises the following components in parts by weight: 60-90 parts of nano-silica, 15-35 parts of a light-screening agent and 1-10 parts of a fiber;

the light-screening agent is silicon carbide with a particle size of 0.01-15 μm;

the fiber comprises a glass fiber, a high-silica fiber and a carbon fiber in a weight ratio of (1-2):(2-3):1; a diameter of the fiber is 3-15 μm and a length of the fiber is 10-20 mm;

the nano-silica is fumed silica or silica aerogel;

a bulk density of the fumed silica is 20-100 $g/m^3$;

the carbon fiber is coated with a polyamide acid coating on a surface of the carbon fiber, and the carbon fiber coated with the polyamide acid coating is prepared by: dissolving pyromellitic dianhydride and diaminodiphenyl ether in N,N-dimethylamide for reaction in a presence of nitrogen, then adjusting a value of pH to 9 with ammonia water to obtain a mixing solution, impregnating the carbon fiber with the mixing solution, and then drying and dispersing the carbon fiber to obtain the carbon fiber coated with the polyamide acid coating;

the reinforcement mesh is a glass fiber mesh, a high-silica fiber mesh, a basalt fiber mesh, a ceramic fiber mesh, a pre-oxidized fiber mesh, a carbon fiber mesh, or a metal mesh;

a method for preparing the nano-silica composite thermal insulation material comprises the following steps:

weighing the raw materials of the thermal insulation layers and mixing the raw materials;

laying a first layer of the raw materials of the thermal insulation layers, spraying the inorganic binder on the first layer of the raw materials of the thermal insulation layers, laying the reinforcement mesh on the first layer of the raw materials of the thermal insulation layers, spraying the inorganic binder on the reinforcement mesh, and then laying a second layer of the raw materials of the thermal insulation layers on the reinforcement mesh to obtain a semi-finished product; and pressing the semi-finished product with a pressure of 0.001-0.2 MPa firstly, and then increasing the pressure to 1-5 MPa at a rate of 0.1-0.3 MPa/min for pressing and molding, thus obtaining the nano-silica composite thermal insulation material.

2. The nano-silica composite thermal insulation material according to claim 1, wherein the inorganic binder is at least one selected from a group consisting of sodium water glass, potassium water glass, and lithium water glass.

3. The nano-silica composite thermal insulation material according to claim 1, wherein the particle size of the silicon carbide is 3-5 μm.

4. The nano-silica composite thermal insulation material according to claim 1, wherein a flame retardant resin layer is provided on a surface of each of the thermal insulation layers.

* * * * *